3,509,254
DEODORIZING AND BACTERICIDAL COMPOSITIONS
Nathan Krotinger, Jr., La Mirada, and Isadore Nusbaum, San Diego, Calif., assignors to Zevel Corporation, La Mirada, Calif., a corporation of California
No Drawing. Filed June 13, 1966, Ser. No. 563,321
The portion of the term of the patent subsequent to Apr. 18, 1984, has been disclaimed
Int. Cl. A61l 13/00; A01n 13/00
U.S. Cl. 424—76                    3 Claims

ABSTRACT OF THE DISCLOSURE

Compositions comprising water-soluble zinc salts and water-soluble chelating acids for preventing fecal odors and reducing bacterial contamination in recirculating and non-recirculating chemical toilets and a process for using the same are provided.

---

This invention relates to deodorizing and bactericidal compositions particularly for use in chemical toilets such as commonly used in airplanes, boats, campers, trailers, buses, and in other places where sewer connections are not available.

The principal object of the invention is to provide a composition for use in preventing odors originating in chemical toilets after use. Another object is to provide means for preventing or greatly reducing the bacterial contamination and odors of the excretory wastes in a chemical toilet. Another object is to provide a water-dissolved bactericidal and deodorizing composition which may be utilized in treating areas where animal fecal matter or urine are present.

We have discovered that a composition comprising as essential ingredients, a water soluble zinc salt and a water soluble chelating acid, applied in suitable concentrations in water in chemical toilets, preferably before initial use, or sprayed on waste matter, or sprayed on the premises that were contaminated with waste matter, are effective in odor prevention and capable of substantial destruction of bacteria.

The compositions of this invention are particularly suitable for use in chemical toilets of all types, because in these toilets there is only a relatively small dilution of the excretory wastes. Chemical toilets of either the recirculating or non-recirculating types are emptied at varying lengths of time after being put in use; therefore the liquids used therein are sometimes required to be chemically stable for long periods of time. The contents of the chemical toilets are held for varying periods of time—in some cases only a few hours, as on passenger airplanes; in others, a week, as in chemical toilets provided around construction jobs; or several weeks, as on cargo airplanes, campers, trailers, or boats not subjected to frequent use. In fallout shelters, the bactericidal liquids themselves should be stable and remain effective for several years. Another requirement is that the liquid must not have an inherent undesirable odor, and it should be capable of preventing and/or suppressing odors resulting from the use of the toilets. The liquids should not cause any undue water pollution problems following the disposal of the chemical toilet wastes, and in addition, the liquid should be ultimately disposable in a community sewerage system without damage thereto. In chemical toilets such as on airplanes, boats, campers, or trailers where leakage or spillage of the toilet contents can occur during emptying operations, or where the toilet is in public use, as in a passenger airplane, substantial reduction of bacteria is a necessity from a public health aspect. The compositions described herein are capable of meeting all of these requirements. These compositions are most effective if they are placed in the chemical toilet before the initial use, as they then act to prevent bacterial decomposition of the subsequently added waste material. These compositions are also effective if applied to the toilet subsequent to its initial use; but if a long interval of time intervenes, permitting the liquid waste mixture to become septic, these compositions will not be very effective when added to the decomposing wastes.

The compositions described herein, when applied as water solutions in effective concentration, are capable of suppressing and preventing malodors of manure piles, animal feed lots, sanitary land-fills, meat rendering plants, poultry processing plants, garbage containers, and the like. Wherever odorous and/or putrifying wastes exist, or the premises where such wastes have been, or vehicles that have been contaminated by such wastes, have to be deodorized, water solutions of the compositions are capable of preventing and of reducing the malodors.

The following examples will illustrate the effectiveness of the invented compositions and methods.

EXAMPLE 1

A recirculating chemical toilet was charged with three gallons of water, in which was dissolved a mixture of 3.2 ounces of zinc sulfate monohydrate and 0.8 ounce of citric acid. This toilet was subjected to human use, consisting of 4 bowel evacuations and 20 urinations, the final volume being about 10 gallons. The bacterial concentration, as tested according to the coliform density test ("Standard Methods for the Examination of Water and Wastewater," 12th Edition, published by American Public Health Association, New York, 1965) was 360 MPN (most probable number) in a 100 ml. sample. There was no fecal odor. A similar chemical type toilet under similar test conditions, but without any added zinc sulfate and citric acid mixture dissolved in the water, had a bacterial concentration in excess of 8,000,000,000 and a strong fecal odor.

We have determined experimentally that an effective concentration of the zinc (as zinc ion) is in the range from 0.001 to 1.3 pounds of zinc per gallon of aqueous liquid, the minimum being determined by its effectiveness under conditions and extent of use, and the maximum established by reasons of avoiding undue waste, and/or by the solubility of the zinc salt. The zinc salt used is preferably zinc sulfate, but any water soluble zinc salt, such as the chloride, nitrate, acetate, etc., may be used.

The chelating acid acts to maintain an acid hydrogen ion (pH) concentration and to chelate some of the zinc ions. The chelated zinc is slowly released during the toilet's use by the neutralization action of the added urine. The chelating acid concentration has been determined experimentally to be in the range from .0001 to 1.0 pound per gallon of aqueous liquid, depending on the solubility and molecular weight of the chelating acid, and upon the number of carboxyl groups in the acid molecule. An aliphatic hydroxy acid is preferred such as malic acid or citric acid, but other water soluble aliphatic hydroxy acids such as hydroxyacetic acid, tartaric acid, lactic acid, gluconic acid, and racemic acid may also be used. The dibasic unsaturated aliphatic acids such as fumaric acid may be used. Other dibasic aliphatic acids may also be used, for examples, maleic acid, succinic acid, oxalic acid, malonic acid, glutaric acid, and adipic acid. Other well known chelating acids that combine with water soluble zinc ion, such as, for example, ethylene diamine tetraacetic acid, may be used.

EXAMPLE 2

A non-recirculating chemical toilet was charged with 2 gallons of water, in which was dissolved a mixture of 1.6 ounces of zinc sulfate monohydrate and 0.4 ounce of malic acid. This toilet was subjected to human use, consisting of 2 bowel evacuations and numerous urinations. There was no fecal odor, even after the toilet contents were retained for several days before final disposal.

EXAMPLE 3

A mixture of 1.6 ounces of zinc sulfate monohydrate, 0.4 ounce of malic acid, 0.02 ounce of "Armohib 31," a corrosion inhibitor made by Armour Ind. Chem. Co., Chicago, and 0.01 ounce of a masking agent, was put into a urinal before initial use. The facility was used numerous times without flushing, as is the common practice in public urinals. The only apparent odor was of the masking agent. A nearby urinal that had not been dosed before initial use with this chemical mixture had a strong urine odor.

Compatible materials, such as masking agents, corrosion inhibitors, detergents, antifoaming agents, and coloring agents, may be used with the compositions above described, without detracting from the effectiveness of the essential ingredients.

While dry mixed compositions prepared for direct addition to the water already in toilets before use is the preferred manner of application, it is also contemplated that the compositions herein described may be made up in aqueous solutions for addition to chemical toilets and for application by spraying, in the agricultural and industrial uses above described, where the concentration may be selected for the existing specific contamination. Dry mixtures are more suitable for chemical toilets in campers and trailers where storage space is limited, and weight is a factor. Large operators of chemical toilets, such as airlines, may prefer a liquid mixture for ease in rapidly serving the toilet units. This servicing takes place after emptying the recirculating toilet holding tank contents, flushing with clean water, and then recharging the holding tank with several gallons of water containing the selected composition. The recirculating chemical toilet is then ready for the initial use.

We claim:

1. The process for preventng fecal odors and reducing bacterial contamination in recirculating and non-recirculating chemical toilets, comprising adding to the liquid in said toilet before initial use an amount of water-soluble zinc salts and water-soluble chelating acid to provide a concentration of zinc as zinc ions in the range from .001 to 1.3 pounds per gallon of aqueous liquid and a chelating acid in the range from .0001 to 1.0 pound per gallon of aqueous liquid, the chelating acid being selected from the group consisting of malic acid, citric acid, fumaric acid, hydroxyacetic acid, tartaric acid, lactic acid, gluconic acid, racemic acid, maleic acid, succinic acid, oxalic acid, malonic acid, glutaric acid, adipic acid, and ethylene diamine tetraacetic acid, and the zinc salts being selected from the group consisting of zinc sulfate, zinc chloride, zinc nitrate and zinc acetate.

2. A composition for use in recirculating and non-recirculating chemical toilets, consisting essentially of a water-soluble zinc salt and a water-soluble chelating acid, the proportions being selected to provide, when dissolved in the water in said toilet, an active zinc ion concentration in the range from .001 to 1.3 pounds per gallon of aqueous liquid in said toilet and a chelating acid concentration in the range from .0001 to 1.0 pound per gallon of aqueous liquid in said toilet, the zinc salt being selected from the group consisting of zinc sulfate, zinc chloride, zinc nitrate and zinc acetate, and the chelating acid being selected from the group consisting of malic acid, citric acid, fumaric acid, hydroxyacetic acid, tartaric acid, lactic acid, gluconic acid, racemic acid, maleic acid, succinic acid, oxalic acid, malonic acid, glutaric acid, adipic acid, and ethylene diamine acid.

3. A liquid composition for preventing odors and bacterial decomposition in excretra and other odor-producing decomposable wastes consisting essentially of water, a water soluble zinc salt, and a water soluble chelating acid for the zinc ions from said zinc salt, the concentration of the zinc salt being from .001 to 1.3 pounds per gallon of water, and the chelating acid being in the concentration of .0001 to 1.0 pound per gallon of water; the zinc salt being selected from the group consisting of zinc sulfate, zinc chloride, zinc nitrate and zinc acetate, and the chelating acid being selected from the group consisting of malic acid, citric acid, fumaric acid, hydroxyacetic acid, tartaric acid, lactic acid, glutonic acid, racemic acid, maleic acid, succinic acid, oxalic acid, malonic acid, glutaric acid, adipic acid, and ethylene diamine tetraacetic acid.

References Cited

UNITED STATES PATENTS

| | | | |
|---|---|---|---|
| 2,904,466 | 9/1959 | Sakornbut | 424—289 |
| 3,079,213 | 2/1963 | Mendelsohn et al. | 424—145 |
| 3,116,105 | 12/1963 | Kerst | 21—2.7 |
| 3,208,936 | 9/1965 | Hamilton | 252—1 |
| 3,226,320 | 12/1965 | Meuly, et al. | 210—63 |
| 3,314,745 | 4/1967 | Krotinger et al. | 21—55 |
| 3,328,304 | 6/1967 | Globus | 252—80 |
| 3,329,607 | 7/1967 | Colobert et al. | 210—61 |

OTHER REFERENCES

Chemical Abstracts vol. 48 pp. 497–498 (1954).

ALBERT T. MEYERS, Primary Examiner

F. E. WADDELL, Assistant Examiner

U.S. Cl. X.R.

21—55; 424—145, 289, 317